(12) United States Patent
Schicketanz et al.

(10) Patent No.: US 6,322,766 B1
(45) Date of Patent: Nov. 27, 2001

(54) PREPARATION OF OXIDES OF NITROGEN HAVING A LOW DEGREE OF OXIDATION

(75) Inventors: Walter Schicketanz; Volker Schumacher; Gerhard Siebert, all of Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/492,086

(22) Filed: Jan. 27, 2000

(30) Foreign Application Priority Data

Jan. 29, 1999 (DE) .............................................. 199 03 616

(51) Int. Cl.⁷ .................................................. C01B 21/26
(52) U.S. Cl. ............................................ 423/403; 423/404
(58) Field of Search ...................................... 423/403, 404

(56) References Cited

U.S. PATENT DOCUMENTS

| | | | |
|---|---|---|---|
| 5,256,387 | 10/1993 | Campbell | 423/392 |
| 5,266,291 | * 11/1993 | Drnevich et al. | 423/403 |
| 5,360,603 | * 11/1994 | Drnevich et al. | 423/403 |
| 5,849,257 | * 12/1998 | Fujiwara et al. | 423/403 |

FOREIGN PATENT DOCUMENTS

| | | |
|---|---|---|
| 1 040 002 | 10/1958 | (DE) . |
| 21 48 707 | 6/1972 | (DE) . |
| 22 16 328 | 10/1972 | (DE) . |
| 0 194 715 | 9/1986 | (EP) . |
| 1 236 819 | 6/1971 | (GB) . |
| 09009292 | 7/1991 | (JP) . |
| 6122505 | 5/1994 | (JP) . |
| 6122507 | 5/1994 | (JP) . |
| 08040710 | 2/1996 | (JP) . |
| 09309709 | 12/1997 | (JP) . |
| 1490071 | 6/1989 | (SU) . |

OTHER PUBLICATIONS

Tkachuk et al. "Characteristics of Oxidation of Ammonia in the Presence of Water Vapor" Chemical Abstract, vol. 107, No. 20 (11/87).

* cited by examiner

*Primary Examiner*—Wayne Langel
(74) *Attorney, Agent, or Firm*—Keil & Weinkauf

(57) ABSTRACT

In a process for preparing oxides of nitrogen having a low degree of oxidation by catalytic oxidation of ammonia, ammonia mixed with air and water vapor is oxidized over an oxidation catalyst.

4 Claims, No Drawings

PREPARATION OF OXIDES OF NITROGEN HAVING A LOW DEGREE OF OXIDATION

Technical-grade oxides of nitrogen ($NO_x$) consist predominantly or entirely of nitrogen monoxide and nitrogen dioxide. They are used industrially as starting material for preparing nitric acid, nitrates and nitrites and also as starting material for chemical reactions, for example nitrosations or nitrations.

Oxides of nitrogen are prepared industrially by oxidation of ammonia by air over noble metal catalysts (for example Pt/Rh or Pt/Rh/Pd) or oxidic catalysts (for example iron oxide, chromium oxide). An aspect that needs to be taken into account is that ammonia can form an explosive mixture with air. Thus, the lower explosive limit of $NH_3$ in air is about 15% by volume, depending on pressure and temperature. To rule out an explosion, it is therefore necessary to maintain a sufficient safety margin to the lower explosive limit in the gas mixture used. For this reason, the ammonia concentration in industrial reactors is generally less than 10% by volume of ammonia, more rarely in the range from 10 to 12% by volume, never above 12.5% by volume.

The catalytic oxidation of ammonia at from about 750 to 950° C. initially forms predominantly nitrogen monoxide which on cooling is oxidized by oxygen present to give nitrogen dioxide. The resulting ratio of $NO_2$ to NO is referred to as the degree of oxidation $\alpha$. The degree of oxidation is defined as the volume of $NO_2$ divided by the total volume of $NO+NO_2$ $$\alpha = NO_2/(NO+NO_2)$$

In the case of a mixture of, for example, 10% by volume of $NH_3$ in air, the oxygen remaining after the oxidation reaction, viz. about 6.4% by volume, is sufficient to oxidize all the nitrogen monoxide formed to nitrogen dioxide. This reaction proceeds to completion even without a catalyst, giving $NO_x$ having a degree of oxidation of 100%.

In numerous reactions such as the nitrosation of organic compounds or the preparation of nitrite solution, oxides of nitrogen having a low degree of oxidation are wanted in order to minimize the formation of by-products, for example nitro compounds or nitrates. In particular, a degree of oxidation $\alpha$ of <50% is frequently desired.

For this purpose, the following procedures are known.

Increasing the $NH_3$ concentration in the $NH_3$/air mixture

At a higher ammonia concentration, the excess of oxygen is reduced, resulting in a lower content of remaining oxygen and thus a lower degree of oxidation. For example, 11% by volume of ammonia in air gives a degree of oxidation of 90% and 12% by volume of $NH_3$ in air gives a degree of oxidation of about 60%. Higher ammonia concentrations are generally not used in the long term for the abovementioned reasons.

Reducing the residence time

When the residence time of the gas mixture downstream of the catalyst is shortened, the NO is not completely converted into $NO_2$, which enables any degree of oxidation to be obtained. However, the degree of oxidation is strongly dependent on the conditions, for example throughput, temperature and pressure, and is therefore difficult to keep constant.

Scrubbing out $NO_2$ by means of water

This forms, in the acid range, nitric acid with simultaneous formation of NO according to the equation $$3NO_2 + H_2O \rightarrow 2HNO_3 + NO$$

Advantage: the degree of oxidation is lowered

Disadvantage: unavoidable formation of sometimes considerable amounts of nitric acid having a low concentration (to achieve a higher concentration, a higher degree of oxidation would be necessary).

Production of pure NO and subsequent oxidation to the desired degree of oxidation Pure NO is produced by combustion of a mixture of ammonia, oxygen and water vapor, with the oxygen/water vapor concentration corresponding to a first approximation to the oxygen/nitrogen ratio in air. As a result, the oxidation over the noble metal catalyst proceeds in a very similar fashion to that in the case of the oxidation of ammonia in air. The water vapor added can, after the oxidation is complete, be removed by simple condensation, cf. EP-A-0 194 715.

Advantage: Pure NO gas having a concentration of over 90% and a degree of oxidation close to zero is obtained.

Disadvantage: Use of expensive oxygen gas, additional use of water vapor, complicated regulation of the mixture for safety reasons.

It is an object of the present invention to provide a process for preparing oxides of nitrogen having a low degree of oxidation by catalytic oxidation of ammonia, which process avoids the disadvantages of the known processes and allows the degree of oxidation to be set in a simple and inexpensive manner.

We have found that this object is achieved by a process for preparing oxides of nitrogen having a low degree of oxidation by catalytic oxidation of ammonia, in which ammonia mixed with air and water vapor is oxidized over an oxidation catalyst.

In this process, the proportion of water vapor in the gas mixture used is preferably from 1 to 50% by volume, particularly preferably from 2 to 30% by volume, in particular from 5 to 20% by volume.

The proportion of ammonia in the gas mixture used is preferably from 7.5 to 12.5% by volume, particularly preferably from 10 to 12% by volume. The remainder of the gas mixture is air.

The degree of oxidation, determined as the volume of $NO_2$ as a proportion of the total volume of NO and $NO_2$, is preferably from 33 to 55%, particularly preferably from 40 to 50%, in particular less than 50%.

In the process of the present invention, the gas mixture is preferably passed continuously over an oxidation catalyst. As oxidation catalyst, it is possible to use all catalysts which can accelerate the oxidation of ammonia to oxides of nitrogen. Preference is given to using catalysts comprising noble metals or catalysts comprising metal oxides. Examples of such catalysts are Pt/Rh or Pt/Rh/Pd catalysts or catalysts based on iron oxide or cobalt oxide, likewise manganese oxide, bismuth oxide and/or cobalt oxide, or else copper oxide, chromium oxide, nickel oxide, cf. JP-A-05 9592, U.S. Pat. No. 5,256,387, BE 781,836 and BE 773,432.

The reaction is preferably carried out at a pressure in the range from 1 to 15 bar, particularly preferably from 1 to 10 bar, in particular from 2 to 5 bar. The temperature in the reaction is preferably in the range from 600 to 950° C., particularly preferably from 750 to 900° C., in particular from 800 to 900° C.

The process can, for example, be carried out using the procedure described in Ullmanns Enzyklopädie der technischen Chemie, Volume 20, p. 307 ff. (1981).

After the reaction is complete, the water vapor is preferably removed from the product mixture by condensation, so that the product can be further processed or worked up simply.

Compared to known processes, the process of the present invention has the advantages that the degree of oxidation in the gas mixture can be set to the desired value, no expensive oxygen has to be used as gas, only a small addition of water vapor is necessary and no additional nitric acid is obtained in the product mixture.

The invention is illustrated by the examples below.

EXAMPLE 1

In a laboratory apparatus, ammonia in an ammonia/air mixture having a concentration of 10 or 11% by volume of ammonia was reacted at 913° C. over a Pt/Rh gauze at a throughput of 15 g/h of ammonia per cm$^3$ of gauze area to give nitrogen oxide. In various experiments, proportions of the air were replaced by a corresponding addition of steam.

The gaseous reaction mixture was quickly cooled to separate off both the water vapor formed and the water vapor added. The remaining gas mixture was, after a residence time of about 2 minutes, analyzed for oxides of nitrogen present and their degree of oxidation ($\alpha$). The following results were obtained:

| Experiment | NH$_3$ | Addition of steam | $\alpha$ |
|---|---|---|---|
| 1A | 10% by volume | none | 100% |
| 1B | 10% by volume | 10% by volume | 86% |
| 1C | 10% by volume | 20% by volume | 44% |
| 2A | 11% by volume | none | 90% |
| 2B | 11% by volume | 10% by volume | 52% |
| 2C | 11% by volume | 15% by volume | 32% |

EXAMPLE 2

An industrial reactor for the catalytic oxidation of ammonia to oxides of nitrogen, which was equipped with a platinum/rhodium gauze as catalyst and a heat exchanger, was supplied with a mixture of 11.8% by volume of ammonia in air; the throughput over the catalyst was 4.6 metric tons/day of NO per m$^2$ of noble metal gauze. The temperature in the reactor was about 880° C. and the gas was cooled to 50° C. in the downstream heat exchanger. After the water vapor formed had been condensed out, the proportion of NO$_2$ in the NO$_x$ formed was about 65%.

In a next experiment, 5% of the air was replaced by water vapor, leaving the other reaction conditions unchanged. After the water vapor had been condensed out, the proportion of NO$_2$ in the NO$_x$ formed was about 45%.

We claim:

1. A process for preparing oxides of nitrogen by catalytic oxidation of ammonia which comprises oxidizing ammonia mixed with air and water over an oxidation catalyst at a temperature of 600 to 950° C. and wherein the volume of NO$_2$ is less than 50% based on the total volume of NO+NO$_2$, the proportion of water vapor in the gas mixture is 2 to 30% by volume and the proportion of ammonia in the gas mixture is 10 to 12% by volume, the remainder of the gas mixture being air.

2. A process as claimed in claim 1, wherein the oxidation catalyst used is a catalyst comprising noble metals or a catalyst comprising metal oxides.

3. A process as claimed in claim 1, wherein the oxidation is carried out at a pressure in the range from 1 to 15 bar.

4. A process as claimed in claim 1, wherein the water vapor is, after the oxidation, removed from the product mixture by condensation.

* * * * *